(12) United States Patent
Shaw et al.

(10) Patent No.: US 7,950,706 B2
(45) Date of Patent: May 31, 2011

(54) MAGNETIC BUMPER GUARD

(76) Inventors: Mark D. Shaw, Ponte Vedra Beach, FL (US); J. Tad Heyman, Atlantic Beach, FL (US); Mathias Legros, Galluis (FR); Thierry Agullo Ponce, Feucherolles (FR)

( * ) Notice: Subject to any disclaimer, the term of this patent is extended or adjusted under 35 U.S.C. 154(b) by 100 days.

(21) Appl. No.: 12/319,246

(22) Filed: Jan. 5, 2009

(65) Prior Publication Data
US 2009/0250954 A1    Oct. 8, 2009

Related U.S. Application Data

(60) Provisional application No. 61/010,089, filed on Jan. 4, 2008.

(51) Int. Cl.
*B60R 19/44* (2006.01)
(52) U.S. Cl. ........................................ 293/142
(58) Field of Classification Search .............. 293/128, 293/142; 405/212, 216; 267/136, 139, 140; 114/219, 364; 188/32; 52/515
See application file for complete search history.

(56) References Cited

U.S. PATENT DOCUMENTS

| | | | | |
|---|---|---|---|---|
| 3,025,559 A | * | 3/1962 | Basinger | 16/85 |
| 3,302,566 A | * | 2/1967 | Blanchet | 101/405 |
| 3,480,894 A | | 11/1969 | Joyce | |
| 3,582,134 A | * | 6/1971 | Shaff | 293/128 |
| 3,843,475 A | * | 10/1974 | Kent | 428/35.8 |
| 3,864,653 A | | 2/1975 | Walker | |
| 4,002,362 A | * | 1/1977 | Sears et al. | 293/120 |
| 4,014,583 A | * | 3/1977 | Forbes | 293/128 |
| 4,113,110 A | | 9/1978 | Mittag | |
| 4,384,375 A | * | 5/1983 | Gerome | 4/240 |
| 4,430,833 A | | 2/1984 | Balzer et al. | |
| 4,505,502 A | * | 3/1985 | Tomita | 292/251.5 |
| 4,703,531 A | | 11/1987 | Bissett | |
| 4,708,380 A | * | 11/1987 | Cruz | 293/128 |
| 4,726,614 A | * | 2/1988 | Myers et al. | 293/128 |
| 4,852,919 A | * | 8/1989 | Nimee et al. | 292/251.5 |
| 4,871,205 A | * | 10/1989 | Bray | 293/128 |
| 5,060,994 A | * | 10/1991 | Martin et al. | 293/128 |
| 5,267,763 A | | 12/1993 | Klein | |
| 5,286,536 A | * | 2/1994 | Gross et al. | 428/31 |
| 5,313,754 A | | 5/1994 | Jensen | |
| 5,399,393 A | * | 3/1995 | Zoller | 428/31 |
| 5,525,384 A | | 6/1996 | Gilmore et al. | |
| 5,762,245 A | * | 6/1998 | Hurst | 224/311 |
| 6,179,354 B1 | * | 1/2001 | Bennett, Jr. | 293/128 |
| 6,186,564 B1 | * | 2/2001 | Ashcroft | 293/128 |
| D446,484 S | * | 8/2001 | Martel | D12/167 |
| 6,318,293 B1 | | 11/2001 | Cranfill et al. | |

(Continued)

FOREIGN PATENT DOCUMENTS
WO    WO 2005/049453 A1    6/2005

*Primary Examiner* — Hilary Gutman
(74) *Attorney, Agent, or Firm* — Thomas C. Saitta

(57) ABSTRACT

A magnetic bumper guard, the guard being constructed such that it may be magnetically mounted onto a structural member to be protected, such as the corner, post, rail or leg of a structure composed of a suitable metal, the guard having a rear wall bounded by a pair of side flanges, a magnet-receiving recess positioned within the rear wall, a hollow interior, a rounded or curved forward wall, and a magnet, whereby frontal force is absorbed by the guard and lateral or angular forces cause the guard to disengage from the structural member, thereby dissipating the force.

16 Claims, 4 Drawing Sheets

U.S. PATENT DOCUMENTS

| | | | |
|---|---|---|---|
| 6,527,319 B1 * | 3/2003 | Martel | 293/128 |
| 6,626,303 B1 | 9/2003 | Moodie | |
| 6,955,383 B2 * | 10/2005 | Cano | 293/128 |
| 7,163,244 B2 * | 1/2007 | Meltzer | 293/128 |
| 7,374,214 B2 * | 5/2008 | Debs | 293/128 |
| 7,527,320 B1 * | 5/2009 | Nevell, Jr. | 293/102 |

* cited by examiner

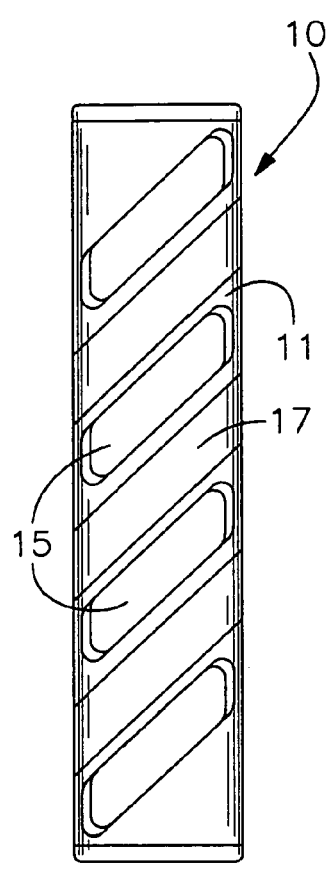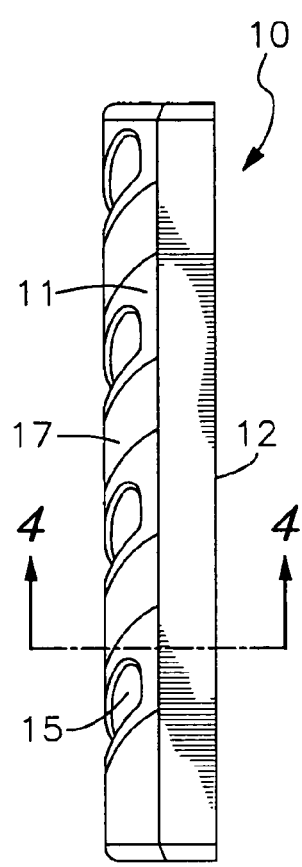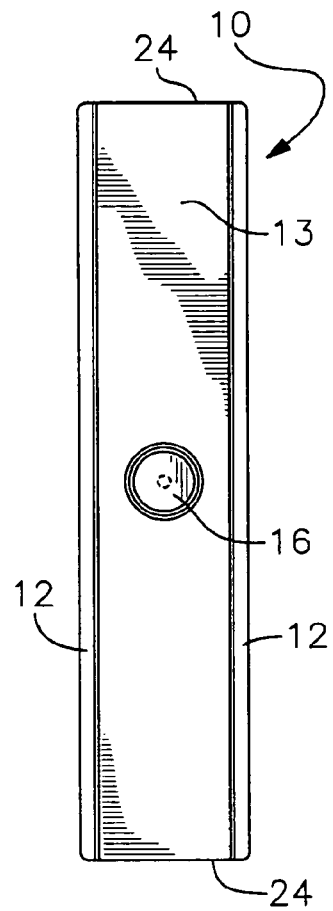
*Fig. 1*  *Fig. 2*  *Fig. 3*
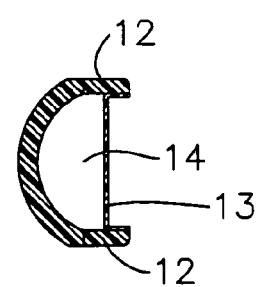
*Fig. 4*

US 7,950,706 B2

MAGNETIC BUMPER GUARD

This application claims the benefit of U.S. Provisional Patent Application Ser. No. 61/010/089, filed Jan. 4, 2008.

BACKGROUND OF THE INVENTION

This invention relates generally to the field of guards used to protect exposed corners, legs, posts or the like, and more particularly to such guards having shock-absorbing properties and which are magnetically mounted to the structure being protected.

The use of bumper guard to protect exposed structural components from accidental damage, such as for example the corners, posts or legs of storage shelves or racks found in warehouses and the like, is well known. Such shelves or racks are often accidentally damaged by hand trucks and forklifts used to move goods within the warehouse, often requiring that the shelves be unloaded for repair or replacement. The guards are sometimes permanently mounted to the structure being protected, such as with mechanical fasteners, straps or adhesives, while others are mounted in a manner which allows the guard to be more quickly released, such as by providing the guard with a pressure-fit or snap-on configuration, or with the use of magnets, when the structure is composed of a suitable metal. Some guards are relatively thin and non-resilient, such that marring of the protected structure is prevented, but possess no shock-absorbing or force-deflecting properties.

It is an object of this invention to provide a magnetic bumper guard of an improved design, such that the guard prevents surface damage to the protected structure, is easily installed, has shock-absorbing and force-deflecting characteristics due to its material of composition and its structural design, and which readily detaches from the protected structure in response to angled or lateral force, such that the force is not transferred directly into the protected structure.

SUMMARY OF THE INVENTION

The invention comprises in general a magnetic bumper guard, the guard being constructed such that it may be magnetically mounted onto a structural member to be protected, such as the corner, post, rail or leg of a structure composed of a suitable metal, the guard having a rear wall bounded by a pair of side flanges, a magnet-receiving recess positioned within the rear wall, a hollow interior, and a rounded or curved forward wall. In this manner, the magnet bumper guard is easily applied to an elongated, rectangular portion of the structural member such that the magnetic mounting member retains the guard in place and such that the side flanges laterally protect the exposed edges of the structural member. The hollow interior and the rounded forward wall absorb forces occurring from the frontal direction, while the magnetic mounting member allows the guard to be disengaged from the structural member when sufficient angled or lateral forces occur in excess of the magnetic attractive force, such that the forces are not transferred into the structural member being protected. The side flanges prevent the guard from sliding in the lateral direction when only a small amount of angled or lateral force is applied, but allow the guard to release when a minimum level of force is exceeded.

BRIEF DESCRIPTION OF THE DRAWINGS

FIG. 1 is a front view of an embodiment of the invention.
FIG. 2 is a side view of the embodiment of FIG. 1.
FIG. 3 is a rear view of the embodiment of FIG. 1.
FIG. 4 is a top view of the embodiment of FIG. 1.

DETAILED DESCRIPTION OF THE INVENTION

With reference to the drawings, the invention will now be described in detail with regard for the best mode and preferred embodiment. In general, the invention is a magnetic bumper guard, i.e., a bumper guard magnetically affixed or mounted to a metal structural member, such as for example the elongated, generally rectangular in cross-section, post, rail or leg of a shelf or rack. The metal structural member may also be L-shaped or I-shaped in cross-section. The purpose of the guard to prevent or minimize damage to the protected structural member, such as might occur for example as a result of accidental contact with hand trucks or forklifts. The guard is able to absorb force from the frontal direction and to deflect force from the angular or lateral direction, the guard being detached or disengaged from the structural element when force in excess of the magnetic attractive force occurs laterally or angularly. In either event the guard protects the structure because the potentially damaging forces are not transferred into the structural member.

Figure 7:
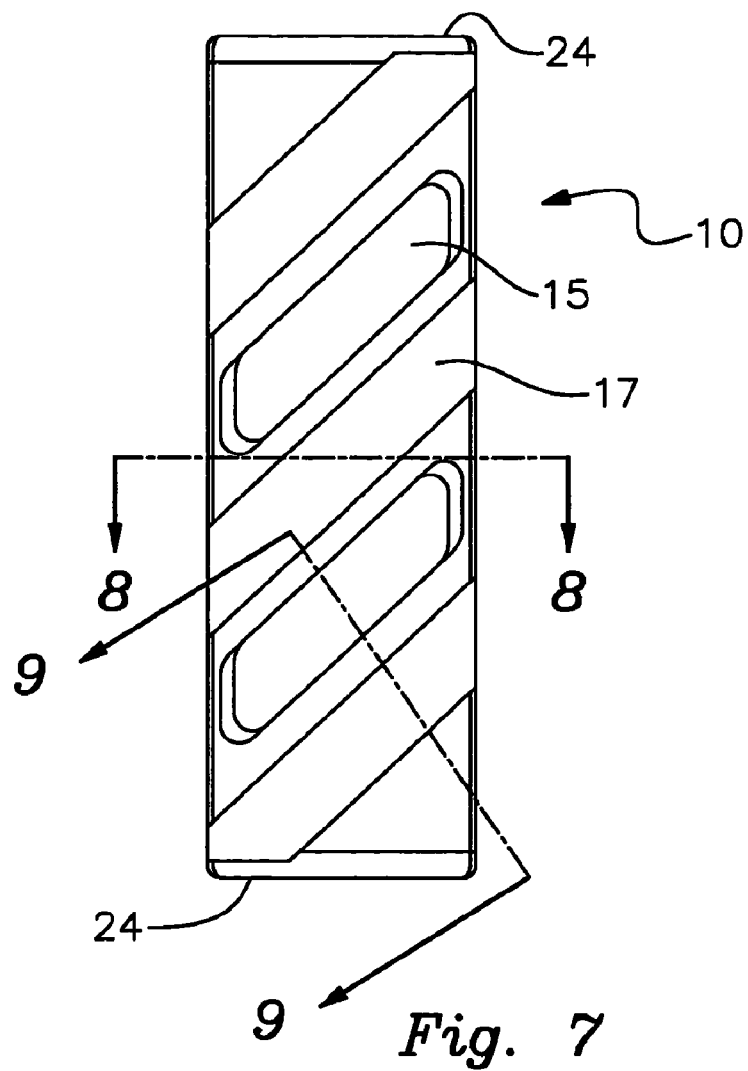
FIG. 7 is a front view of an alternative embodiment of the invention.
Figure 8:
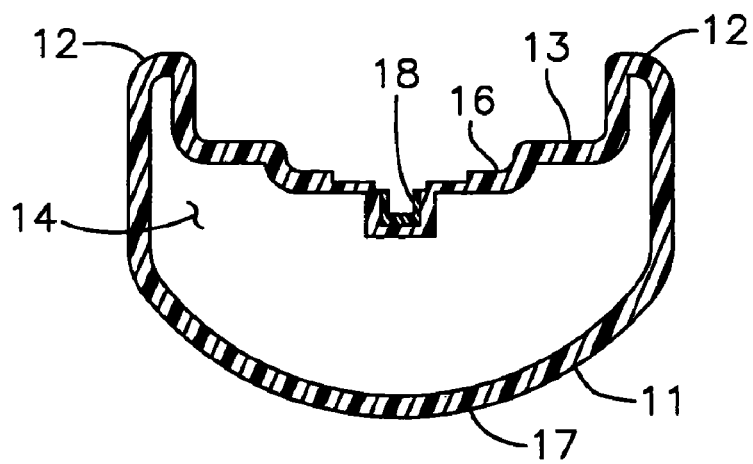
FIG. 8 is a cross-sectional view of the embodiment of FIG. 7, taken along lines VIII-VIII.
Figure 9:
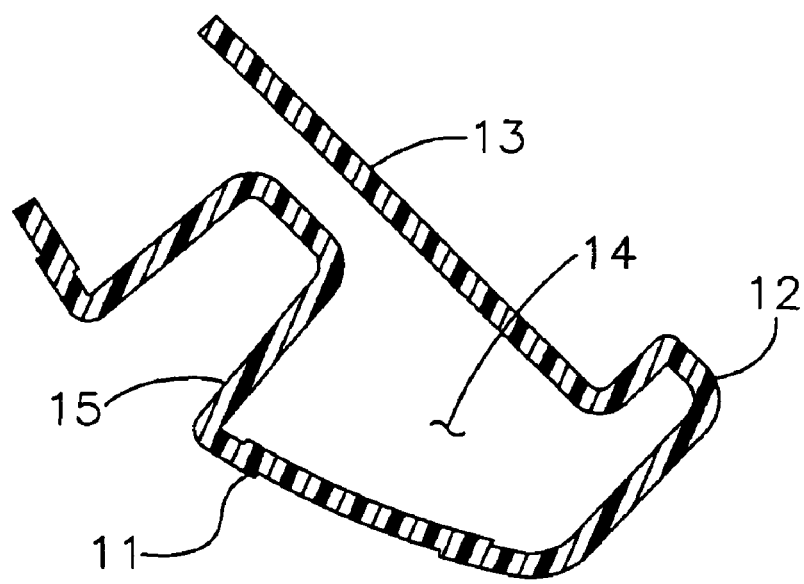
FIG. 9 is a cross-sectional view of the embodiment of FIG. 7, taken along lines IX-IX.
Figure 10:
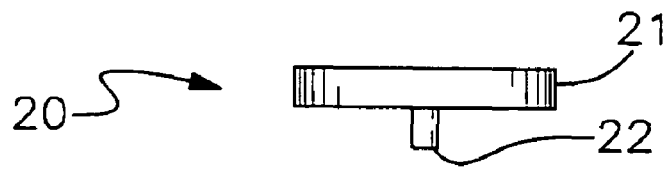
FIG. 10 is a top view of an embodiment of the magnetic mounting means.
Figure 11:
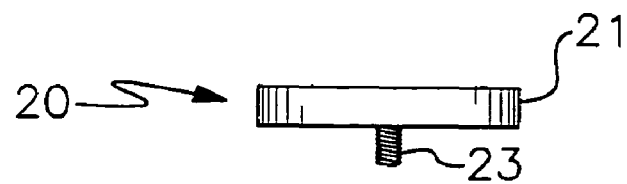
FIG. 11 is a top view of an alternative embodiment of the magnetic mounting member, showing a threaded mounting pin.

A first embodiment of the bumper guard 10 is shown in FIGS. 1 through 6, while a second shorter embodiment 10 is illustrated in FIGS. 7 through 9. The cross-sectional FIGS. 8 and 9 are also applicable to the embodiment of FIGS. 1 through 6. Two possible embodiments for the magnetic mounting means 20 are shown in FIGS. 10 and 11, and are applicable to either embodiment. It is to be understood that other structural configurations for the guard 10 and magnetic mounting means 20 will be suitable, it being impossible to illustrate all possible configurations, and therefore the illustrations should not be taken as limiting.

The bumper guard 10 is a generally elongated member composed of a resilient, compressible or flexible material, such as polyethylene or other polymers of similar physical characteristics, whereby the material of composition is of suitable structural integrity such that the configuration of the bumper guard 10 will be maintained under relatively light force. The bumper guard 10 may be manufactured using blow molding, injection molding, roto-molding or similar known techniques. The bumper guard 10 comprises a rounded or curved forward wall 11, a pair of elongated opposing side flanges 12 and an elongated rear wall 13, side flanges 12 extending rearward from rear wall 13 and in combination defining a channel. The rear wall 13 extends to both ends 24 of the bumper guard 10, which most preferably are flat. The forward wall 11, side flanges 12 and rear wall 13 are preferably composed as a continuous and relatively thin wall, such that a hollow interior 14 is defined by the combination of these elements. Reinforcing recess members 15 may be formed in the forward wall 11 for added structural integrity, and visual warning indicia 17 of bright or contrasting colors may also be added to the forward wall 11.

Figure 5:
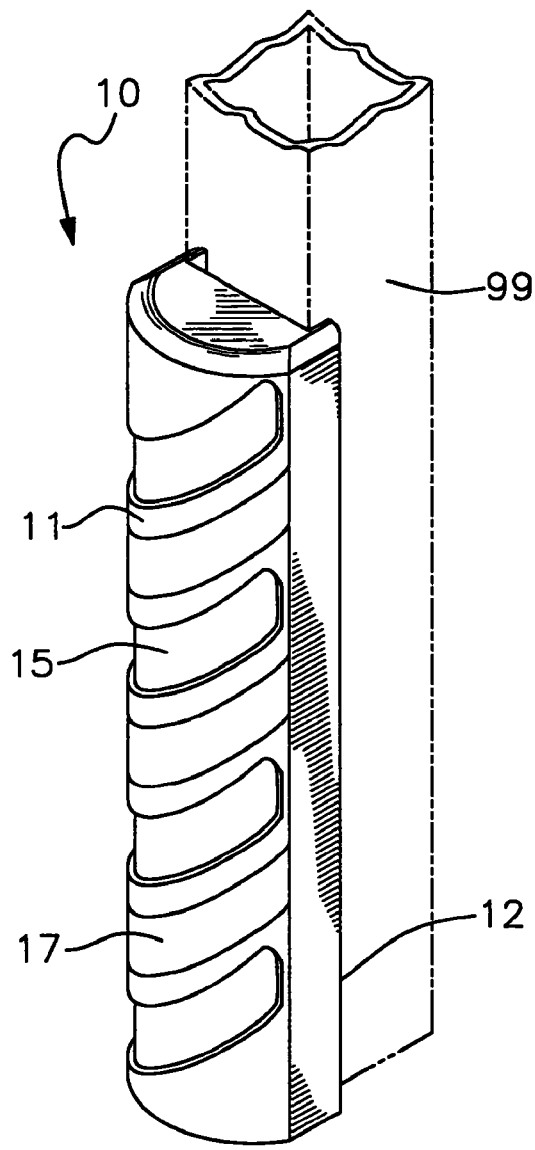
FIG. 5 is a front perspective view of the embodiment of FIG. 1, and shown as mounted onto a protected structural member.
Figure 6:
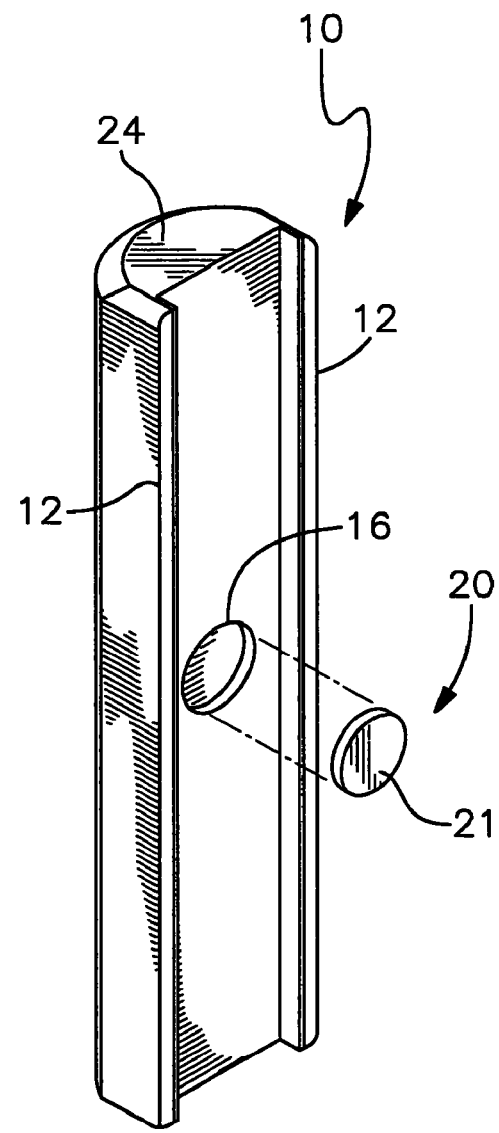
FIG. 6 is a rear perspective view of the embodiment of FIG. 1, and showing the magnetic mounting member in expanded view.

The combination of the side flanges 12 and the rear wall 13 define a means for receiving the elongated, generally rectangular portion of the structural member 99 to be protected, as shown in FIG. 5, whereby the rear wall 13 is positioned flush against the face of the structural member 99 and whereby the side flanges 12 envelop and extend a short distance beyond opposing edges of the structural member 99. One or both of the side flanges 12 may be extended a greater distance than illustrated if it is desired to protect more of the sides of the structural member 99, but the extended side flange 12 should not be so great as to preclude the guard 10 from being displaced by lateral or angular forces. As a representative example, a bumper guard 10 that is approximately 5 and ⅜ inches wide, 3 and ¼ inches deep and 15 and ½ inches tall, with a channel 13 approximately ¾ inches deep and 4 inches wide, has been found to provide excellent protection to structural members 99 of varying widths not in excess of 4 inches. Multiple bumper guards 10 may be stacked vertically on the same structural member 99.

One or more magnetic mounting members 20 for mounting or securing the guard 10 to the structural member 99 are provided on the rear of the bumper guard 10, most preferably in the rear wall 13. While other configurations for the magnetic mounting member 20 is possible, such as for example rectangular configurations, the preferred embodiments shown in FIGS. 10 and 11 comprise a circular or disc magnet 21 having a mounting post 22 or threaded post 23. A magnet-receiving recess 16 is provided within rear wall 13, the magnet-receiving recess 16 being configured such that the magnet 21 is readily retained therein with the outer face of the magnet 21 being flush with or extended slightly from the surface of the rear wall 13 so as to readily contact the face of the structural member 99 when the guard 10 is put into use. The magnetic mounting member 20 may be secured using any suitable means, such as for example adhesives applied to the rear of the magnet 21, adhesives applied to post 22 if present, a press-fit or friction-fit for either the magnet 21 and/or the post 22, a threaded bore 18 positioned within the magnet-receiving recess 16, etc.

In this manner, the magnet bumper guard 10 is easily applied to the structural member 99 to be protected using the magnetic mounting member 20. The guard is therefore not permanently mounted to the structural member 99 or mounted in such a manner that removal of the guard 10 is difficult or results in destruction of the mounting components, such as if a guard is mounted using mechanical fasteners, straps, adhesives of the like. Lateral or vertical adjustment of the guard 10 is easily accomplished. In the event of application of frontal force, i.e., force occurring in the direction toward the forward wall 11 and the face of the structural member 99, the somewhat flexible or collapsible forward wall 11 and the hollow interior 14 absorb the force and distribute it laterally, thereby precluding or reducing the force so as to protect the structural member 99. In the event the force is applied at an angle or laterally, the force is again absorbed by flexation of the forward wall 11 and side flange 12 in combination with the hollow interior 14, until the force exceeds the magnetic attraction force of the magnetic mounting member 20, in which case the guard is displaced or disengaged from the structural member 99, such that the lateral or angular force is not directly transferred to the structural member, again reducing or eliminating any damage to the structural member 99. The side flanges 14 prevent the guard 10 from sliding laterally or being displaced by small amounts of lateral or angled force, but do not retain the guard 10 on the structural member 99 in the event that a damaging amount of force is encountered.

It is understood that equivalents and substitutions for certain elements set forth above may be obvious to those skilled in the art, and therefore the true definition and scope of the invention is to be as set forth in the following claims.

We claim:

1. A bumper guard comprising an elongated main body having a hollow interior, a rounded forward wall, a rear wall having a planar surface, a pair of opposing side flanges extending rearward from said forward wall and said rear wall, said side flanges each extending rearward a distance less than the width of said rear wall, and a magnet-receiving recess positioned in said rear wall;

and a magnetic mounting member adapted to retain said guard on a metal structural member, said magnetic mounting member positioned within said magnet-receiving recess;

wherein the combination of said rear wall and said side flanges defines a means for receiving an elongated, generally rectangular portion of said structural member to be protected, wherein said rear wall and said side flanges abut said elongated, generally rectangular portion of said structural member;

whereby said forward wall of said guard collapses to absorb force occurring from the frontal direction, and further whereby said guard is disengaged from said structural member when angular or lateral forces sufficient to overcome the magnetic attraction force occur, the rearward extension of said side flanges being insufficient to prevent such disengagement.

2. The bumper guard of claim 1, further comprising reinforcing recess members positioned in said forward wall.

3. The bumper guard of claim 2, further comprising visual indicia positioned on said forward wall.

4. The bumper guard of claim 1, further comprising visual indicia positioned on said forward wall.

5. The bumper guard of claim 1, said magnetic mounting member comprising a magnet and a mounting post.

6. The bumper guard of claim 1, further comprising a threaded bore positioned within said magnet-receiving recess, and said magnetic mounting member comprising a magnet and a threaded post.

7. The bumper guard of claim 1, wherein said means for receiving said elongated, generally rectangular portion of said structural member to be protected has a depth of less than approximately ¾ inches.

8. The bumper guard of claim 7, wherein said rear wall has a width of approximately four inches.

9. The bumper guard of claim 1, wherein said main body is composed of polyethylene.

10. The bumper guard of claim 1, said main body further comprising flat ends, and wherein said rear wall extends to said flat ends.

11. A bumper guard comprising an elongated main body having a hollow interior, a rounded forward wall, reinforcing recess members positioned in said forward wall, visual indicia positioned on said forward wall, flat ends, a rear wall having a planar surface, a pair of opposing side flanges extending rearward from said forward wall and said rear wall, said side flanges each extending rearward a distance less than the width of said rear wall, said rear wall extending to said flat ends, and a magnet-receiving recess positioned in said rear wall;

and a magnetic mounting member adapted to retain said guard on a metal structural member, said magnetic mounting member positioned within said magnet-receiving recess;

wherein the combination of said rear wall and said side flanges defines a means for receiving an elongated, generally rectangular portion of said structural, member to be protected, wherein said rear wall and said side flanges abut said elongated, generally rectangular portion of said structural member;

whereby said forward wall of said guard collapses to absorb force occurring from the frontal direction, and further whereby said guard is disengaged from said structural member when angular or lateral forces sufficient to overcome the magnetic attraction force occur, the rearward extension of said side flanges being insufficient to prevent such disengagement.

12. The bumper guard of claim 11, said magnetic mounting member comprising a magnet and a mounting post.

13. The bumper guard of claim 11, further comprising a threaded bore positioned within said magnet-receiving recess, and said magnetic mounting member comprising a magnet and a threaded post.

14. The bumper guard of claim 11, wherein said means for receiving said elongated, generally rectangular portion of said structural member to be protected has a depth of less than approximately ¾ inches.

15. The bumper guard of claim 14, wherein said rear wall has a width of approximately four inches.

16. The bumper guard of claim 11, wherein said main body is composed of polyethylene.

* * * * *